United States Patent [19]

Harvey

[11] 4,239,361
[45] Dec. 16, 1980

[54] CAMERA HAVING ELECTRONIC STROBE FLASH APPARATUS CHARGEABLE DURING VIEWFINDER FRAMING OF A SCENE

[75] Inventor: Donald M. Harvey, Webster, N.Y.

[73] Assignee: Eastman Kodak Company, Rochester, N.Y.

[21] Appl. No.: 111,427

[22] Filed: Jan. 11, 1980

[51] Int. Cl.³ .................. G03B 15/03; G03B 13/02; G03B 17/38
[52] U.S. Cl. .................................. 354/145; 354/219; 354/266
[58] Field of Search ............... 354/219, 152 VS, 202, 354/221–225, 199, 288, 266, 267, 149, 145, 126, 129, 32–35, 128, 236

[56] References Cited

U.S. PATENT DOCUMENTS

| 993,047 | 5/1911 | Folmer | 354/236 |
|---|---|---|---|
| 3,611,896 | 10/1971 | Aoki | 354/202 |
| 3,651,372 | 3/1972 | Uchida et al. | 354/128 |
| 3,810,227 | 5/1974 | Tanaka | 354/266 X |
| 3,946,408 | 3/1976 | Taguchi | 354/267 X |
| 3,953,864 | 4/1976 | Iwata et al. | 354/145 X |
| 4,007,469 | 2/1977 | Land et al. | 354/33 X |
| 4,084,167 | 4/1978 | Iwata | 354/33 |
| 4,112,447 | 9/1978 | Iwata | 354/145 |

FOREIGN PATENT DOCUMENTS 2257281 5/1973 Fed. Rep. of Germany ......... 354/266

Primary Examiner—Donald A. Griffin
Attorney, Agent, or Firm—D. P. Monteith

[57] ABSTRACT

A camera includes a battery-powered electronic strobe flash unit having a flashtube and a capacitor chargeable by the battery for supplying energy to fire the flashtube. A switch has first and second conditions for respectively preventing and causing the charging of the capacitor. A cover member is mounted for movement from (1) a viewfinder-covering position for preventing a scene to be photographed from being framed within the camera's viewfinder, into (2) a viewfinder-uncovering position for permitting the scene to be framed. A shutter release button is coupled to both the switch and the cover member for causing the switch to assume its second condition and the cover member to move into its viewfinder-uncovering position during pre-exposure movement of the release button. This causes charging of the capacitor while a scene is being framed without delaying the photographic exposure.

4 Claims, 2 Drawing Figures

CAMERA HAVING ELECTRONIC STROBE FLASH APPARATUS CHARGEABLE DURING VIEWFINDER FRAMING OF A SCENE

BACKGROUND OF THE INVENTION (1) Field of the Invention

This invention relates to a camera having a built-in battery-powered electronic strobe flash unit. More particularly, this invention provides for charging of the flash unit while a photographer is framing a scene to be photographed within the camera's viewfinder. This prevents energy from being drawn from the battery unnecessarily and permits charging of the flash unit without delaying the photographic exposure.

(2) Description of the Prior Art

A battery-powered electronic strobe flash unit draws a relatively large amount of energy from the battery for charging a capacitor to a voltage level that is necessary to fire the strobe unit's flashtube. When a flash unit is provided with a camera, an even heavier load is placed on the battery if it is also required to supply energy to other camera components such as a film transport motor. To prevent battery energy from being wasted it is desirable to charge the flash unit only if a flash exposure is to be made.

It is known in the prior art to provide for the charging of an electronic strobe flash unit in response to pre-exposure movement of a camera shutter release member so that the flash unit is charged only for a flash exposure. For example, U.S. Pat. No. 3,651,372 describes structure for charging a flash unit in response to pre-exposure movement of a release member of the illumination reflected from a scene to be photographed as below a predetermined level. A lamp is energized during flash unit charging. A camera operator is supposed to delay further actuation of the release member to open the shutter until the lamp is de-energized.

U.S. Pat. No. 3,953,864 describes apparatus for charging a flash unit in response to movement of a camera body release member when the subject brightness is below a predetermined level and the subject is within a given distance of the camera.

U.S. Pat. No. 4,007,469 describes an arrangement for charging a flash unit in response to pre-exposure movement of a camera release member if the subject brightness is below a given level. While flash charging occurs, a camera shutter is retained in a closed position.

U.S. Pat. No. 4,084,167 describes camera structure for charging a built-in strobe flash unit when a shutter release member is actuated if the scene brightness is low. An energized electromagnet latches the release member in a pre-exposure position while the flash unit charges. Once the flash is charged, the electromagnet is de-energized to unlatch the release member so that the shutter can be opened.

In the aforementioned prior art, the charging of the flash unit normally would occur only after the camera operator has framed the scene to be photographed within the camera's viewfinder. Accordingly, flash unit charging causes a delay in making an exposure, beyond the time used to aim the camera. This delay can cause loss of picture-taking opportunities, particularly those involving fast-action scenes. Furthermore, it can be annoying to a subject posing for a picture because a longer posing time is required and the additional uncertainty as to when an exposure is to occur makes it more difficult to maintain the proper pose.

SUMMARY OF THE INVENTION

In accordance with the present invention, a camera includes a viewfinder, a chargeable electronic strobe flash unit, and a switch having first and second conditions for preventing and causing respectively, the charging of the strobe flash unit. A cover member is mounted for movement between a viewfinder-covering position for preventing a scene from being framed within the viewfinder, and a viewfinder-uncovering position for permitting the scene to be framed within the viewfinder. A release member is mounted for pre-exposure movement to a position to effect a photographic exposure. The release member is coupled to the cover member and to the switch for (a) moving the cover member from its viewfinder-covering position into its viewfinder-uncovering position and (b) causing the switch to assume its second condition during pre-exposure movement of the release member, thereby causing charging of the flash unit while the scene is being framed and before photographic exposure.

The invention, and its advantages, will become more apparent in the detailed description of a preferred embodiment presented below.

DESCRIPTION OF THE DRAWING

In a detailed description of a preferred embodiment of the invention presented below, reference is made to the accompanying drawing, in which.

DETAILED DESCRIPTION OF A PREFERRED EMBODIMENT

Because photographic cameras and electronic strobe flash units are well known, the present description will be directed in particular to elements forming part of, or cooperating more directly with, apparatus in accordance with the present invention. It is to be understood that camera and strobe flash elements not specifically shown or described may take various forms well known to those having skill in the art.

Figure 1:
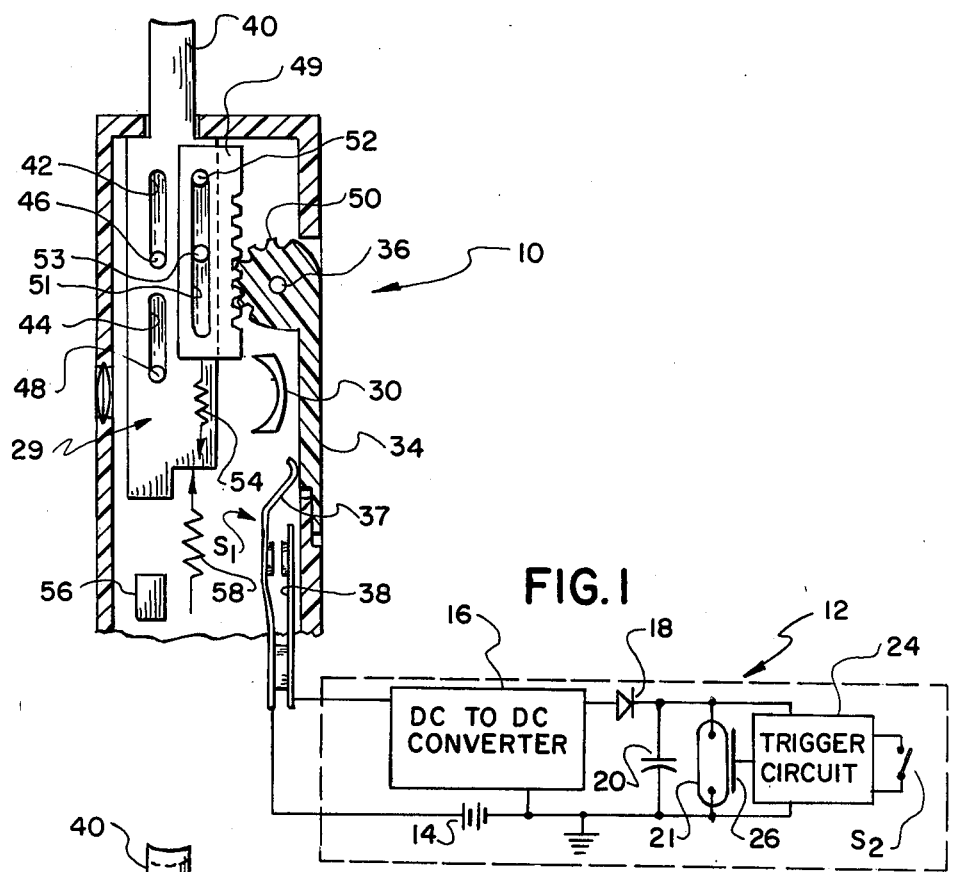
FIG. 1 is a diagrammatic view partly in section of a portion of a camera having a shutter release button and a battery-powered electronic strobe flash unit.

Referring to FIG. 1, a camera, denoted 10, contains an electronic strobe flash unit 12. A battery 14 energizes a DC to DC converter 16 when a normally open power switch $S_1$ is closed. By means well known in the electronic strobe flash art, the converter 16 is arranged to produce a series of alternating voltage pulses. The positive pulses cause a diode 18 to conduct and charge a capacitor 20 to a voltage that is necessary to fire a flashtube 21.

The capacitor 20 and the flashtube 21 are selected so that the flashtube can be fired with the energy stored on the capacitor 20 when it is charged to approximately 150 volts. The battery 14 and the converter 16 are arranged to charge the capacitor 20 to this voltage in less than approximately two seconds.

An X-synchronization switch $S_2$ is arranged to close when a shutter (not shown) is open, thereby exposing photographic film (also not shown) in the camera 10. The closing of the switch $S_2$ causes a trigger circuit 24 to produce a high-voltage pulse at an external electrode 26 of the flashtube 21 that triggers it into conduction. In response to the conduction of the flashtube 21, the capacitor 20 discharges through the flashtube to ground to produce a high intensity light pulse.

The camera 10 has a viewfinder 29 including a lens 30. A lens cover 34 is mounted for pivotal movement about a shaft 36 from a viewfinder-covering position, shown in FIG. 1, which prevents a scene from being framed within the viewfinder, into a viewfinder-uncovering position, shown in FIG. 2, which permits the scene to be framed. When the cover 34 is in its viewfinder-covering position, it also prevents dust and other foreign matter from staining the lens 30. When the cover 34 is in its viewfinder-uncovering position, it serves as a sunshade.

The cover 34 is arranged with respect to the switch $S_1$ so that energy is drawn from the battery 14 to charge the capacitor 20 when the cover is open for framing a scene within the viewfinder 29. For that purpose, the cover 34 is arranged to engage one contact 37 of the switch $S_1$ to retain it in an open position when the cover is in its viewfinder-covering position, and to release the contact 37 so that it can engage its companion contact 38 to close the switch $S_1$, thereby connecting the battery 14 to the converter 16, when the cover 34 moves from its viewfinder-covering position toward its viewfinder-uncovering position.

Figure 2:
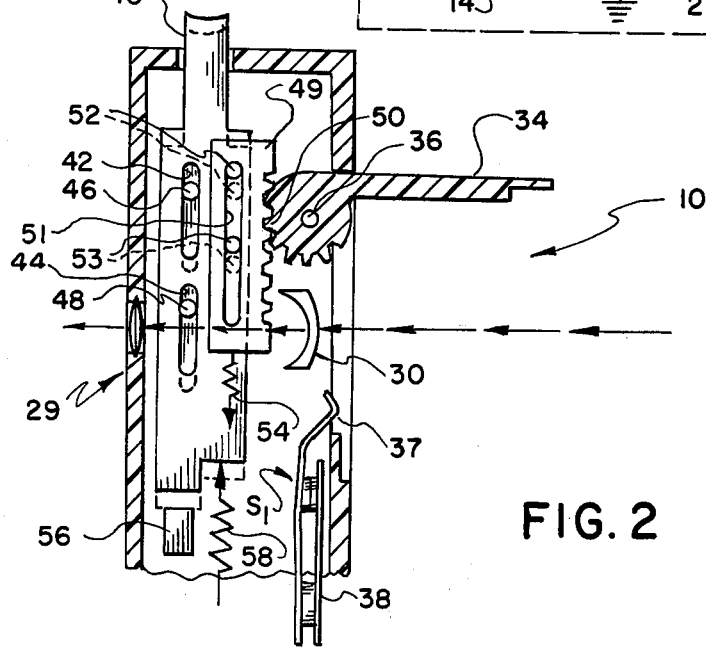
FIG. 2 is a view showing the position of the shutter release button of FIG. 1 when it is partially depressed prior to a photographic exposure, and in phantom lines when it is depressed for an exposure.

A spring-biased shutter release button 40 is arranged for vertical movement, as viewed in the drawing, between an initial, pre-exposure position, shown in FIG. 1, to a final, exposure-effecting position, shown by the phantom lines of FIG. 2. The button 40 has a pair of elongate vertical slots 42 and 44 which receive pins 46 and 48, respectively, for guiding the button in the vertical direction.

A spring-biased rack 49 is arranged to mesh with a pinion 50, formed on the lens cover 34, to pivot the cover 34 in the counterclockwise direction, as viewed in the drawing, from its viewfinder-covering into its viewfinder-uncovering position during pre-exposure movement of the button 40. For that purpose, the rack 49 has an elongate vertical slot 51 adapted to receive a pair of spaced pins 52 and 53, which are connected to the button 40 and which guide the rack in the vertical direction. As the button 40 moves initially toward its final position, a spring 54 pulls the rack 49 downwardly thereby causing the lens cover 34 to pivot into its viewfinder-uncovering position.

An element 56 is located in the path of the button 40 so as to be actuated when the button is in its final position. When the element 56 is actuated, the camera shutter opens to expose the film in the camera 10.

A strong spring 58 biases the button 40 upwardly with a force that is stronger than the downward force which the spring 54 applies to the rack 49 so that the spring 58 can return the release button 40 from its final position into its initial position. During return movement of the button 40 into its initial position, the pin 52 causes the rack 49 to return to its position of FIG. 1, against the influence of the spring 54.

In addition to preventing energy transfer from the battery 14 to the flash unit 12 until an exposure is to be made, the lens cover 34 causes the charging of the capacitor 20 to occur relative to the uncovering of the viewfinder 29 so that no delay need arise in making a photographic exposure once the camera 10 has been aimed at the scene to be photographed. For that purpose, the lens cover 34 allows the camera operator to frame the scene within the viewfinder 29 only after flash unit charging has commenced. By the time the scene has been framed, the converter 16 has charged the capacitor 20, and a flash exposure can be made.

When the camera 10 is not being used, it is in the condition shown in FIG. 1. There, the switch $S_1$ is open so that the battery 14 is not connected to the converter 16. Also the lens cover 34 covers the lens 30 to keep dirt and other foreign matter off it.

As a camera operator depresses the shutter button 40 to make an exposure, the rack 49 meshes with the pinion 50 so that the lens cover 34 pivots from its viewfinder-covering position toward its viewfinder-uncovering position. When the cover 34 pivots from its viewfinder-covering position, the contact 37 engages the contact 38 to close the switch $S_1$ immediately, thereby energizing the converter 16, even before the operator can look through the viewfinder 29 to frame the scene. As the operator depresses the button 40 to an intermediate, pre-exposure position, shown by the solid lines of FIG. 2, the lens cover 34 pivots into its viewfinder-uncovering position, thereby allowing the operator to frame the scene within the viewfinder 29. At this point, the camera operator would not depress the button 40 further to make the exposure until the scene has been framed properly. For most picture-taking situations, the framing time requires a few seconds.

As described previously, the battery 14 and the converter 16 charge the capacitor 20 within approximately two seconds. Therefore, while the lens 30 is being uncovered after the switch $S_1$ is closed, and while the scene is being framed, the capacitor 20 is charged fully. Once the scene is framed, the operator continues the downward stroke of the release button 40, without any delay for charging the flash unit 12. As the operator depresses the button 40 from its intermediate position toward its final position, the pins 52 and 53 slide freely along the slot 51, because the camera housing prevents further pre-exposure movement of both the rack 49 and the lens cover 34. When the button 40 reaches its final position, the release element 56 is actuated to open the shutter. In response to the opening of the shutter, the switch $S_2$ is actuated to trigger the flashtube 21.

When the operator releases the button 40, the spring 58 raises it to its pre-exposure position of FIG. 1, thereby causing the lens cover 34 to return to its viewfinder-covering position as the pin 52 engages the rack 49. In response to the closing of the lens cover 34, the contact 37 is separated from the contact 38 to open the switch $S_1$, thus preserving the energy in the battery 14 when the shutter button 40 is not actuated.

The invention has been described in detail with particular reference to a preferred embodiment thereof, but it will be understood that variations and modifications can be effected within the spirit and scope of the invention.

What is claimed is:

1. In a camera having a viewfinder, chargeable electronic strobe flash apparatus, and actuatable switch means having first and second conditions for respectively preventing and causing the charging of said strobe flash apparatus, the improvement comprising:
   (a) a cover member mounted for movement between a viewfinder-covering position for preventing a photographic scene from being framed within said viewfinder, and a viewfinder-uncovering position for permitting the scene to be framed within said viewfinder;

(b) a release member movably mounted for pre-exposure movement to a position to effect a photographic exposure; and (c) means, coupling said release member to said cover member and said switch means, for (1) moving said cover member from its viewfinder-covering position into its viewfinder-uncovering position and (2) causing said switch means to assume its second condition during pre-exposure movement of said release member, thereby to cause the charging of said strobe flash apparatus while the scene is being framed within said viewfinder and before the exposure is effected.

2. In a camera having a viewfinder, electronic strobe flash apparatus including a capacitor chargeable for firing said strobe flash apparatus, and actuatable switch means having first and second conditions for respectively preventing and causing the charging of said capacitor, the improvement comprising:

(a) a cover member mounted for movement between a viewfinder-covering position for preventing a scene to be photographed from being framed within said viewfinder, and a viewfinder-uncovering position for permitting the scene to be framed within said viewfinder;

(b) a release member movably mounted for pre-exposure movement to a position to effect a photographic exposure; and (c) means, coupling said release member to said cover member and said switch means, for moving said cover member from its viewfinder-covering position into its viewfinder-uncovering position and for causing said switch means to assume its second condition during pre-exposure movement of said release member, thereby to cause the charging of said capacitor during the time used to frame the scene within said viewfinder before the photographic exposure is effected.

3. In a camera having a viewfinder, chargeable electronic strobe flash apparatus, and switch means having first and second conditions for respectively preventing and causing the charging of said strobe flash apparatus, the improvement comprising:

(a) a cover member mounted for movement between a viewfinder-covering position for preventing a photographic scene from being framed within said viewfinder, and a viewfinder-uncovering position for allowing the scene to be framed within said viewfinder, said cover member being coupled to said switch means wherein said switch means (1) is in its first condition when said cover member is in its viewfinder-covering position, and (2) is caused to assume its second condition during movement of said cover member from its viewfinder-covering position toward its viewfinder-uncovering position; and (b) a release member movably mounted for pre-exposure movement to a position to effect a photographic exposure, said release member being coupled to said cover member for causing said cover member to assume its viewfinder-uncovering position during pre-exposure movement of said release member, thereby to cause the charging of said strobe flash apparatus while said viewfinder is being uncovered and the scene is being framed within said viewfinder, and before the exposure is effected.

4. In a camera having a viewfinder, chargeable electronic strobe flash apparatus, and switch means having first and second conditions for respectively preventing and causing the charging of said strobe flash apparatus, the improvement comprising:

(a) a cover member movably mounted between a viewfinder-covering position for preventing a scene to be photographed from being framed within said viewfinder, and a viewfinder-uncovering position for allowing the scene to be framed within said viewfinder;

(b) a release member movably mounted for pre-exposure movement from a first position toward a second position to effect a photographic exposure; and (c) means for coupling said release member to said switch means and said cover member wherein (1) said switch means is in its first condition and said cover member is in its viewfinder-covering position when said release member is in its first position, thereby to prevent the charging of said strobe flash apparatus and the framing of the scene within said viewfinder, and (2) said switch means is caused to assume its second condition and said cover member is caused to assume its viewfinder-uncovering position during pre-exposure movement of said release member toward its second position, thereby to cause the charging of said strobe flash apparatus during the time used to frame the scene within said viewfinder before the photographic exposure is effected.

* * * * *